US008665822B2

(12) United States Patent
Tseng

(10) Patent No.: US 8,665,822 B2
(45) Date of Patent: Mar. 4, 2014

(54) METHOD AND APPARATUS FOR HANDLING PHYSICAL DOWNLINK CONTROL CHANNEL ORDERS IN WIRELESS COMMUNICATION SYSTEM

(75) Inventor: Li-Chih Tseng, Taipei (TW)

(73) Assignee: Innovative Sonic Corporation, Taipei (TW)

(*) Notice: Subject to any disclaimer, the term of this patent is extended or adjusted under 35 U.S.C. 154(b) by 286 days.

(21) Appl. No.: 12/842,041

(22) Filed: Jul. 23, 2010

(65) Prior Publication Data
US 2011/0019619 A1 Jan. 27, 2011

Related U.S. Application Data

(60) Provisional application No. 61/228,148, filed on Jul. 23, 2009.

(51) Int. Cl.
*H04W 4/00* (2009.01)

(52) U.S. Cl.
USPC ... 370/331; 370/395.21; 370/329; 370/395.2; 370/328; 455/436; 455/439; 455/440; 455/441

(58) Field of Classification Search
USPC ......... 370/328–331, 336–339, 341–345, 437, 370/480–482, 491; 455/412, 168.1, 188.1, 455/418, 422.1, 432.1, 432.3, 434, 455/435.1–435.3, 436, 440, 444, 450, 455/452.1–452.2
See application file for complete search history.

(56) References Cited

U.S. PATENT DOCUMENTS

| 2010/0034303 | A1* | 2/2010 | Damnjanovic et al. | 375/260 |
| 2010/0227569 | A1* | 9/2010 | Bala et al. | 455/73 |
| 2010/0260136 | A1* | 10/2010 | Fan et al. | 370/330 |

OTHER PUBLICATIONS

"LTE; Evolved Universal Terrestrial Radio Access (E-UTRA); Medium Access Control (MAC) protocol specification (3GPP TS 36.321 version 8.6.0 Release 8)", ESTI TS 136 321 V8.6.0, Jul. 2009, XP014044756, cover page +pp. 1-48, ESTI, Sophia Antipolis Cedex, France.
"LTE; Evolved Universal Terrestrial Radio Access (E-UTRA); Physical layer procedures (3GPP TS 36.213 version 8.7.0 Release 8)", ETSI TS 136 213 V8.7.0, Jun. 2009, XP014044750 cover page +pp. 1-78, ESTI, Sophia Antipolis Cedex, France.
Ericsson: "SR triggering in relation to uplink grants", 3GPP TSG-RAN WG2#61bis Tdoc R2-081468, Mar. 31-Apr. 4, 2008, XP050139212, pp. 1-3, Shenzhen, China.
Ericsson et al: "D-SR failure handling", TSG-RAN WG2 Meeting #63bis R2-085388, Sep. 29-Oct. 3, 2008, XP050320232, pp. 1-4, Prague, Czech Republic.
Extended Search Report from EPO on co-pending EP application (10007330.3) dated Oct. 27, 2010.
3GPP TSG-RAN WG2 #66, San Francisco, USA, May 4-8, 2009 (Tdoc R2-092957).
3GPP TS 36.321 V8.6.0 (Jun. 2009).

(Continued)

*Primary Examiner* — Kibrom T Hailu
*Assistant Examiner* — Zewdu A Beyen
(74) *Attorney, Agent, or Firm* — Blue Capital Law Firm, P.C.

(57) ABSTRACT

A method for handling physical downlink control channel (PDCCH) orders in a user equipment (UE) of a wireless communication system is disclosed. The wireless communication system supports Carrier Aggregation, which enables the UE to perform transmission and/or reception through multiple carriers. The method includes steps of configuring a plurality of carriers, receiving a PDCCH order, and using a specific carrier within the plurality of carriers to trigger a random access procedure according to the PDCCH order.

14 Claims, 5 Drawing Sheets

(56) References Cited

OTHER PUBLICATIONS

3GPP TSG RAN WG1 Meeting #57bis, Los Angeles, USA, Jun. 29-Jul. 3, 2009 (R1-092377).
Extended Search Report from EPO on co-pending EP application (10007696.7) dated Dec. 8, 2010.
3GPP, R2-093844, "RACH for Carrier Aggregation", Jun. 2009.
3GPP TSG-RAN WG1 #56 Athens, Greece, Feb. 9-13, 2009 (R1-090924).
3GPP TSG-RAN WG2 Meeting #66bis, Los Angeles, USA, Jun. 29-Jul. 3, 2009 (R2-093922).
Office Action on corresponding foreign application (TW099124294) from TIPO dated Jul. 11, 2013.

* cited by examiner

METHOD AND APPARATUS FOR HANDLING PHYSICAL DOWNLINK CONTROL CHANNEL ORDERS IN WIRELESS COMMUNICATION SYSTEM

CROSS REFERENCE TO RELATED APPLICATIONS

This application claims the benefit of U.S. Provisional Application No. 61/228,148, filed on Jul. 23, 2009 and entitled "Advanced Transmission and Reception for DRX and SR", the contents of which are incorporated herein by reference.

BACKGROUND OF THE INVENTION

1. Field of the Invention

The present invention relates to a method and apparatus for handling PDCCH orders in a wireless communication system, and more particularly, to a method and apparatus capable of enhancing transmission efficiency and spectrum aggregation.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in base stations (Node Bs) alone rather than in Node Bs and RNC (Radio Network Controller) respectively, so that the system structure becomes simple.

In the LTE system, in order to ensure uplink synchronization and normal data transmission, a network terminal sends a Physical Downlink Control Channel (PDCCH) order to a user equipment (UE), such that the UE triggers a Random Access (RA) procedure, and sends a packet including a dedicated preamble indicated in the PDCCH to the network terminal, to perform uplink synchronization.

Therefore, the network terminal can timely indicate the UE to trigger the RA procedure through the PDCCH order, to ensure uplink synchronization. However, to meet future requirements of all kinds of communication services, the 3rd Generation Partnership Project (3GPP) has started to work out a next generation of the LTE system: the LTE Advanced (LTE-A) system. Carrier aggregation (CA), where two or more carriers are aggregated, is introduced into the LTE-A system in order to support wider transmission bandwidths, e.g. up to 100 MHz and for spectrum aggregation. Besides, other than a single-NB deployment, i.e. services in a same area are provided by a same Node B, CA may also be applied to a multi-NB deployment, i.e. services in a same area are provided by multiple Node Bs. When CA is applied in the single-NB deployment, since time alignments of all carriers are the same, operations of uplink synchronization are simpler. However, when CA is applied in the multi-NB deployment, different carriers may have different time alignments. In such a situation, if the UE receives the PDCCH order for performing uplink synchronization, since the UE can use multiple carriers at the same time, the UE has to choose a carrier to perform the RA procedure, which reduces transmission efficiency and spectrum aggregation.

SUMMARY OF THE INVENTION

It is therefore an objective of the present invention to provide a method and apparatus for handling PDCCH orders in a wireless communication system.

The present invention discloses a method for handling physical downlink control channel (PDCCH) orders in a user equipment (UE) of a wireless communication system. The wireless communication system supports Carrier Aggregation (CA), which enables the UE to perform transmission and/or reception through multiple carriers. The method includes steps of configuring a plurality of carriers, receiving a PDCCH order, and using a specific carrier within the plurality of carriers to trigger a random access (RA) procedure according to the PDCCH order.

The present invention further discloses a communication device for handling PDCCH orders in a user equipment (UE) of a wireless communication system. The wireless communication system supports Carrier Aggregation (CA), which enables the UE to perform transmission and/or reception through multiple carriers. The communication device includes a processor for executing a program, and a memory coupled to the processor for storing the program. The program includes steps of configuring a plurality of carriers, receiving a PDCCH order, and using a specific carrier within the plurality of carriers to trigger a random access (RA) procedure according to the PDCCH order.

The present invention further discloses a method for handling physical downlink control channel (PDCCH) orders in a network terminal of a wireless communication system. The wireless communication system supports Carrier Aggregation (CA), which enables a user equipment (UE) to perform transmission and/or reception through multiple carriers. The method includes steps of configuring a plurality of carriers to the UE, generating a carrier information; and including the carrier information in a PDCCH order, and transmitting the PDCCH order to the UE. The PDCCH order is utilized for indicating the UE to trigger a random access (RA) procedure, and the carrier information is utilized for indicating the UE to use a specific carrier within the plurality of carriers to trigger the RA procedure.

The present invention further discloses a communication device for handling PDCCH orders in network terminal of a wireless communication system. The wireless communication system supports Carrier Aggregation (CA), which enables a user equipment (UE) to perform transmission and/or reception through multiple carriers. The communication device includes a processor for executing a program, and a memory coupled to the processor for storing the program. The program includes steps of configuring a plurality of carriers to the UE, generating a carrier information, and including the carrier information in a PDCCH order, and transmitting the PDCCH order to the UE. The PDCCH order is utilized for indicating the UE to trigger a random access (RA) procedure, and the carrier information is utilized for indicating the UE to use at least one specific carrier within the plurality of carriers to trigger the RA procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
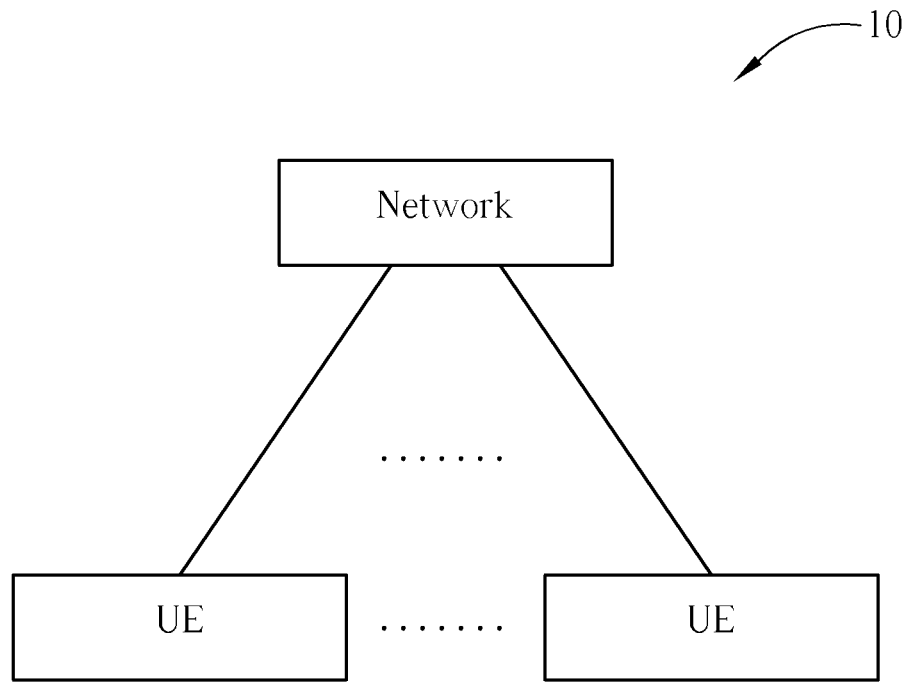
FIG. 1 is a schematic diagram of a wireless communications system.

Please refer to FIG. 1, which illustrates a schematic diagram of a wireless communication system 10. The wireless communication system 10 is preferably an LTE advanced (LTE-A) system, and is briefly composed of a network and a plurality of user equipments (UEs). In FIG. 1, the network and the UEs are simply utilized for illustrating the structure of the wireless communication system 10. Practically, the network may comprise a plurality of base stations (Node Bs), radio network controllers and so on according to actual demands, and the UEs can be devices such as mobile phones, computer systems, etc.

Figure 2:
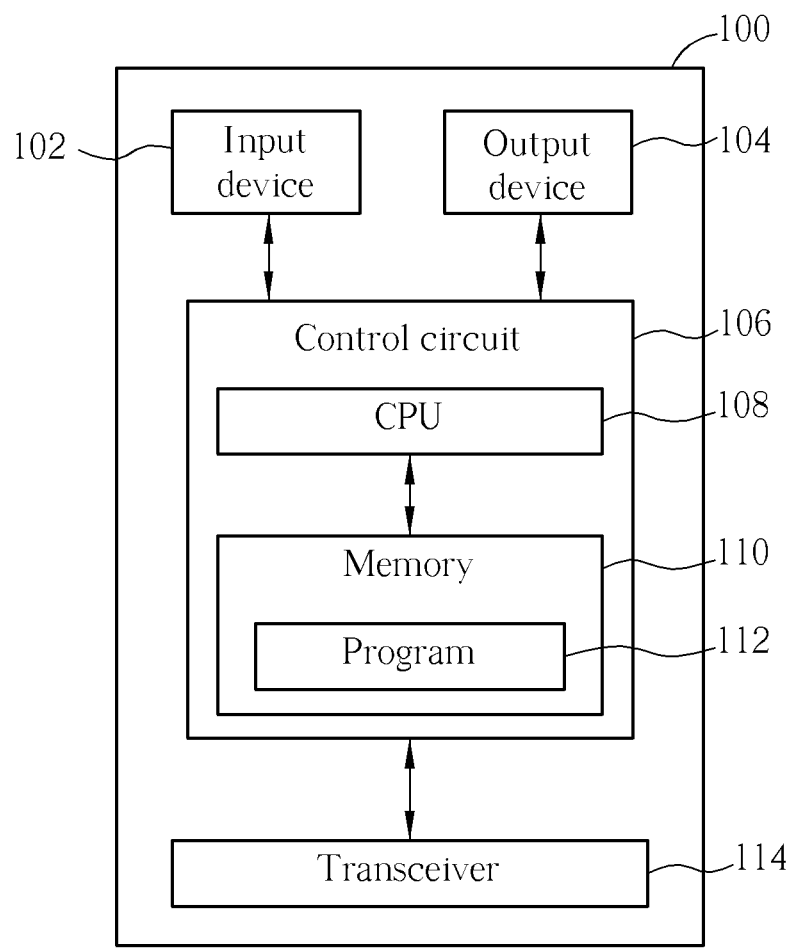
FIG. 2 is a function block diagram of a wireless communications device.

Please refer to FIG. 2, which is a functional block diagram of a communication device 100 in a wireless communication system. The communication device 100 can be utilized for realizing the network or the UEs in FIG. 1. For the sake of brevity, FIG. 2 only shows an input device 102, an output device 104, a control circuit 106, a central processing unit (CPU) 108, a memory 110, a program 112, and a transceiver 114 of the communication device 100. In the communication device 100, the control circuit 106 executes the program 112 in the memory 110 through the CPU 108, thereby controlling an operation of the communication device 100. The communication device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communication protocol framework, the transceiver 114 can be seen as a portion of Layer 1, and the control circuit 106 can be utilized to realize functions of Layer 2 and Layer 3.

Figure 3:
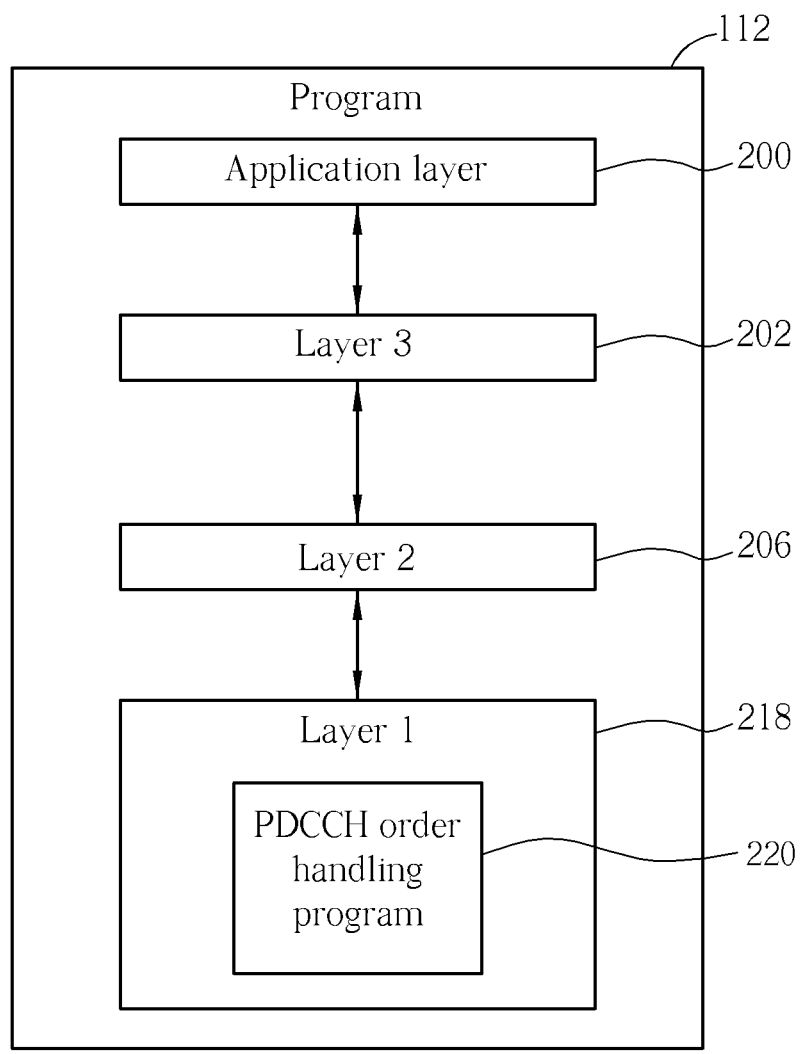
FIG. 3 is a diagram of a program of FIG. 2.

Please continue to refer to FIG. 3. FIG. 3 is a diagram of the program 112 shown in FIG. 2. The program 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

In LTE-A system, the Layer 1 218 and the Layer 2 206 may support a Carrier Aggregation (CA) technology, which enables the UE to perform transmission or reception through multiple carriers configured by the upper layer. In such a situation, the embodiment of the present invention provides a PDCCH order handling program 220 for handling PDCCH orders, to timely trigger a Random Access (RA) procedure.

Figure 4:
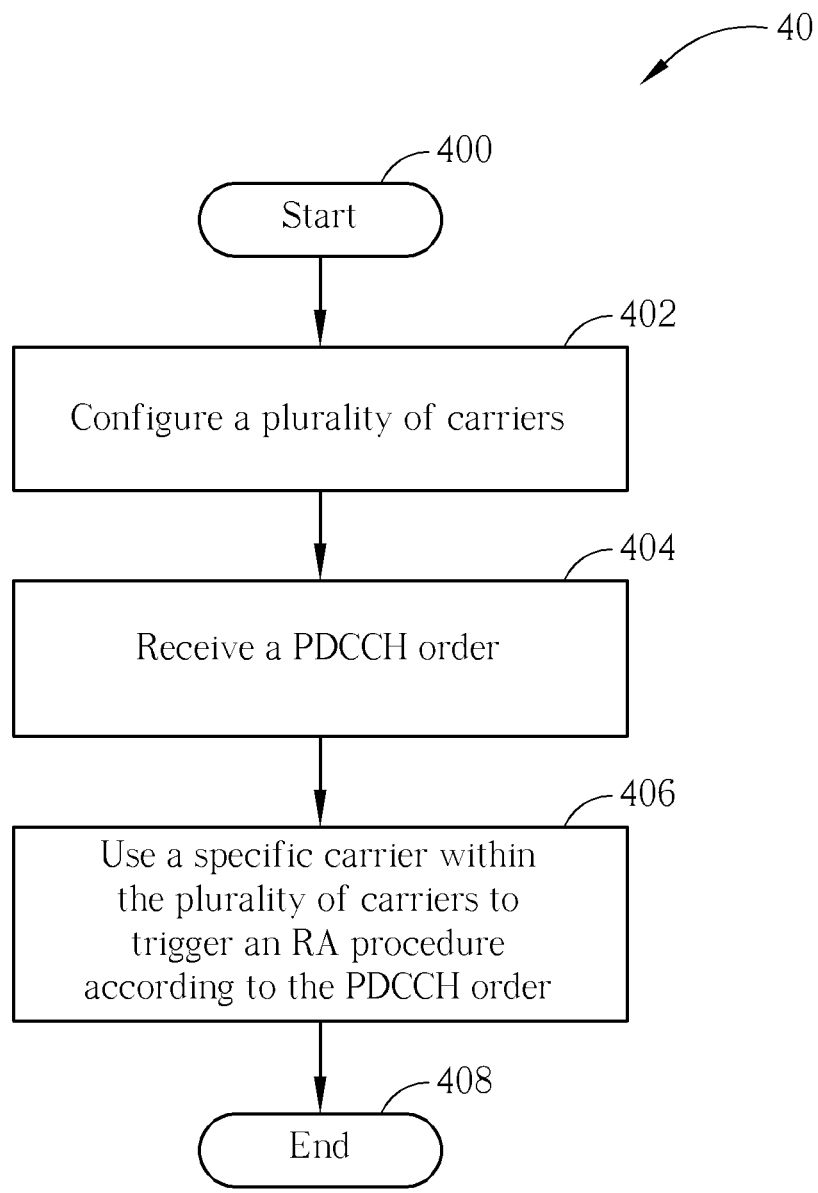
FIG. 4 is a flowchart of a process according to an embodiment of the present invention.

Please refer to FIG. 4, which is a schematic diagram of a process 40 according to an embodiment of the present invention. The process 40 is utilized in a UE of the wireless communication system 10, and can be complied into the PDCCH order handling program 220. The process 40 includes the following steps:

Step 400: Start.
Step 402: Configure a plurality of carriers.
Step 404: Receive a PDCCH order.
Step 406: Use a specific carrier within the plurality of carriers to trigger an RA procedure according to the PDCCH order.
Step 408: End.

According to the process 40, after CA is configured, if the UE receives the PDCCH order from the network terminal, the UE decides a specific carrier within the configured carriers according to the PDCCH order, so as to trigger the RA procedure with the specific carrier, i.e. sending a packet including a dedicated preamble to the network terminal through the specific carrier, to perform uplink synchronization. Noticeably, the "specific carrier" relates to a carrier or Physical Random Access Channel (PRACH) decided according to the PDCCH order, and there may be other specific carriers, i.e. the embodiment of single specific carrier is for simplicity. In other words, once receiving the PDCCH order, the UE can decide the specific carrier to trigger the RA procedure immediately without performing selection or other operations.

In addition, two methods for deciding the specific carrier to trigger the RA procedure are listed as follows, and are not limited to these.

One method is to take a corresponding uplink carrier as the specific carrier to trigger the RA procedure directly when receiving the PDCCH order. In other words, a downlink carrier is corresponding to an uplink carrier, i.e. a pair. When the downlink carrier of a carrier pair receives the PDCCH order, the UE uses the corresponding uplink carrier of the pair to perform the RA procedure. Thus, when receiving the PDCCH order, the UE can decide the specific carrier to trigger the RA procedure immediately without performing selection or other operations.

Figure 5:
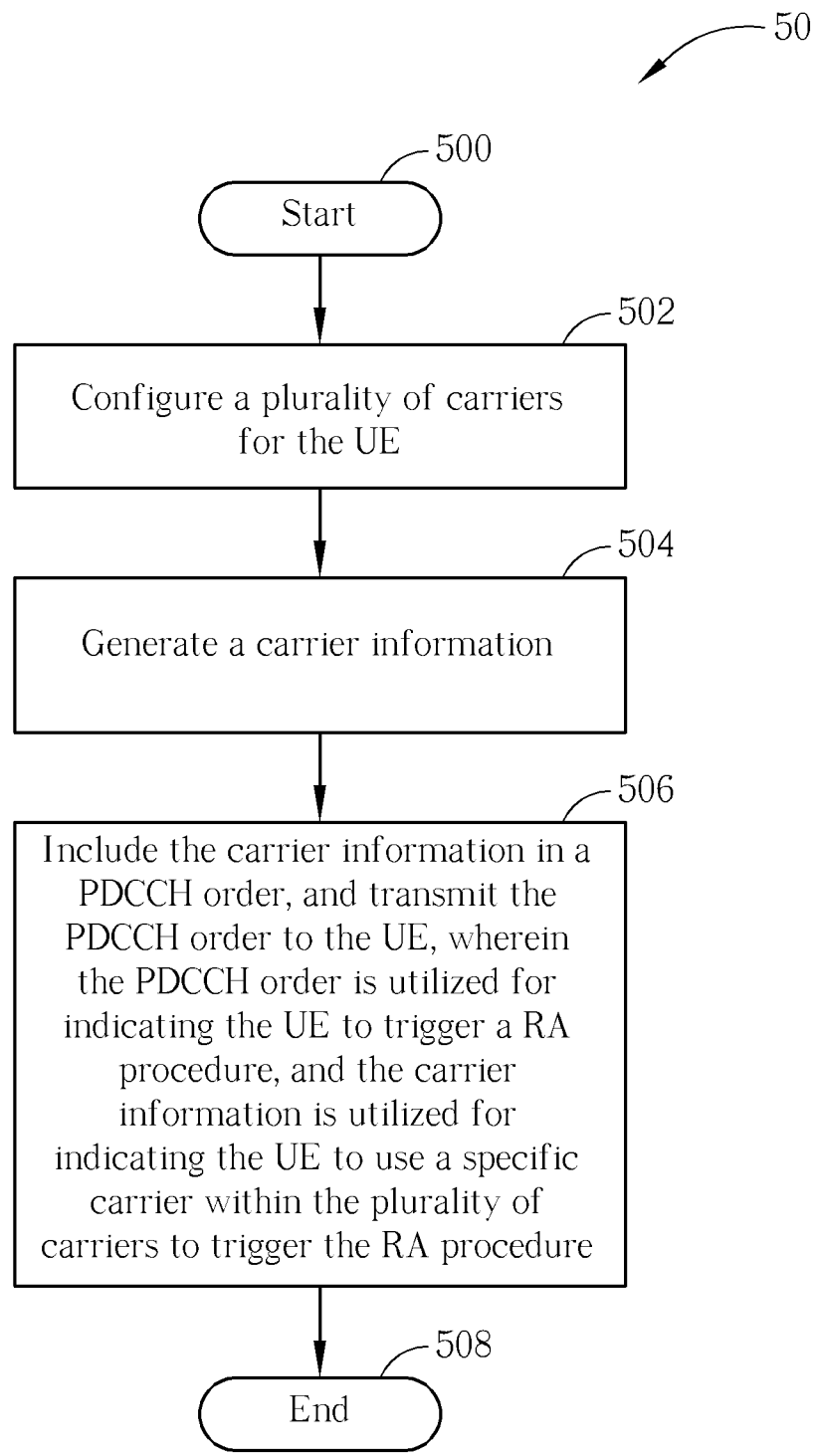
FIG. 5 is a flowchart of another process according to an embodiment of the present invention.

Another method needs to cooperate with the network terminal. Please refer to FIG. 5 first, which is a schematic diagram of a process 50 according to an embodiment of the present invention. The process 50 is utilized in a network terminal of the wireless communication system 10, and can be complied into the PDCCH order handling program 220. The process 50 includes the following steps:

Step 500: Start.
Step 502: Configure a plurality of carriers for the UE.
Step 504: Generate a carrier information.
Step 506: Include the carrier information in a PDCCH order, and transmit the PDCCH order to the UE, wherein the PDCCH order is utilized for indicating the UE to trigger a RA procedure, and the carrier information is utilized for indicating the UE to use a specific carrier within the plurality of carriers to trigger the RA procedure.
Step 508: End.

According to the process 50, the network terminal includes a carrier information in the PDCCH order, and the carrier information indicates the UE to use a specific carrier to trigger the RA procedure. In other words, when the UE receives the PDCCH order, the UE uses an uplink carrier indicated by the network terminal as the specific carrier to trigger the RA procedure according to the carrier information in the PDCCH order. Therefore, when receiving the PDCCH order, the UE can decide the specific carrier to trigger RA procedure immediately without performing selection or other operations.

In the prior art, when CA is applied in the multi-NB deployment, different carriers may have different time alignments. Therefore, if the UE receives the PDCCH order for performing uplink synchronization, since the UE can use multiple carriers at the same time, the UE has to choose a sub-carrier to perform the RA procedure, which reduces transmission efficiency and spectrum aggregation. In comparison, the present invention provides two feasible methods for deciding the uplink carrier to perform the RA procedure. One is to use the uplink carrier corresponding to the downlink carrier for receiving the PDCCH order to perform the RA procedure directly. The other is that the network terminal indicates the UE to use the specific carrier to trigger the RA procedure through the carrier information in the PDCCH order. By doing so, the UE can decide the specific carrier to trigger the RA procedure immediately according to the PDCCH order without performing selection or other operations, so as to enhance transmission efficiency and spectrum aggregation.

Noticeably, the above realization of the steps in the processes 40, 50 should be well known by those skilled in the art. For example, the steps of the processes 40, 50 can be compiled as units into the PDCCH order handling program 220 by instructions, parameters, variables, etc. of specific programming languages.

To sum up, in the embodiment of the present invention, when receiving the PDCCH order, the UE can decide the specific carrier to trigger the RA procedure immediately without performing selection or other operations, so as to enhance transmission efficiency and spectrum aggregation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling physical downlink control channel (PDCCH) orders in a user equipment (UE) of a wireless communication system, the wireless communication system supports Carrier Aggregation (CA), which enables the UE to perform transmission and/or reception through multiple carriers, the method comprising:
   configuring a plurality of carriers;
   receiving a PDCCH order, the PDCCH order includes a carrier information that identifies a specific carrier, within the plurality of carriers, that the UE should use to trigger a random access (RA) procedure without having perform process of considering and selecting which carrier should be used to trigger the RA procedure; and
   using the specific carrier within the plurality of carriers to trigger the random access (RA) procedure according to the PDCCH order.

2. The method of claim 1, wherein receiving the PDCCH order is receiving the PDCCH order through a downlink carrier within the plurality of carriers.

3. The method of claim 2, wherein the specific carrier is an uplink carrier within the plurality of carriers corresponding to the downlink carrier.

4. The method of claim 1, wherein the RA procedure is utilized for uplink synchronization.

5. A communication device for handling PDCCH orders in a user equipment (UE) of a wireless communication system, the wireless communication system supports Carrier Aggregation (CA), which enables the UE to perform transmission and/or reception through multiple carriers, the communication device comprising:
   a processor for executing a program; and
   a memory coupled to the processor for storing the program;
      wherein the program comprises:
      configuring a plurality of carriers;
      receiving a PDCCH order, the PDCCH order includes a carrier information that identifies a specific carrier, within the plurality of carriers, that the UE should use to trigger a random access (RA) procedure without having to perform process of considering and selecting which carrier should be used to trigger the RA procedure; and
      using the specific carrier within the plurality of carriers to trigger the random access (RA) procedure according to the PDCCH order.

6. The communication device of claim 5, wherein receiving the PDCCH order in the program is receiving the PDCCH order through a downlink carrier within the plurality of carriers.

7. The communication device of claim 6, wherein the specific carrier is an uplink carrier within the plurality of carriers corresponding to the downlink carrier.

8. The communication device of claim 5, wherein the RA procedure is utilized for uplink synchronization.

9. A method for handling physical downlink control channel (PDCCH) orders in a network terminal of a wireless communication system, the wireless communication system supports Carrier Aggregation (CA), which enables a user equipment (UE) to perform transmission, and/or reception through multiple carriers, the method comprising:
   configuring a plurality of carriers for the UE;
   generating a carrier information; and
   including the carrier information in a PDCCH order, and transmitting the PDCCH order to the UE;
   wherein the PDCCH order is utilized for indicating the UE to trigger a random access (RA) procedure, and the carrier information identifies a specific carrier within the plurality of carriers that the UE should use to trigger the RA procedure without having to perform process of considering and selecting which carrier should be used to trigger the RA procedure.

10. The method of claim 9, wherein the specific carrier is utilized for uplink transmission.

11. The method of claim 9, wherein the RA procedure is utilized for uplink synchronization.

12. A communication device for handling PDCCH orders in network terminal of a wireless communication system, the wireless communication system supports Carrier Aggregation (CA), which enables a user equipment (UE) to perform transmission and/or reception through multiple carriers, the communication device comprising:
   a processor for executing a program; and
   a memory coupled to the processor for storing the program;
      wherein the program comprises:
      configuring a plurality of carriers for the UE;
      generating a carrier information; and
      including the carrier information in a PDCCH order, and transmitting the PDCCH order to the UE;
      wherein the PDCCH order is utilized for indicating the UE to trigger a random access (RA) procedure, and the carrier information identifies a specific carrier within the plurality of carriers that the UE should use to trigger the RA procedure without having to perform process of considering and selecting which carrier should be used to trigger the RA procedure.

13. The communication device of claim 12, wherein the specific carrier is utilized for uplink transmission.

14. The communication device of claim 12, wherein the RA procedure is utilized for uplink synchronization.

* * * * *